(12) United States Patent
Woopen

(10) Patent No.: US 10,723,217 B2
(45) Date of Patent: Jul. 28, 2020

(54) DRIVE TRAIN SYSTEM

(71) Applicant: Deere & Company, Moline, IL (US)

(72) Inventor: Thomas Woopen, Windeck (DE)

(73) Assignee: DEERE & COMPANY, Moline, IL (US)

( * ) Notice: Subject to any disclaimer, the term of this patent is extended or adjusted under 35 U.S.C. 154(b) by 113 days.

(21) Appl. No.: 15/705,464

(22) Filed: Sep. 15, 2017

(65) Prior Publication Data

US 2018/0072150 A1 Mar. 15, 2018

(30) Foreign Application Priority Data

Sep. 15, 2016 (DE) .......... 10 2016 217 616

(51) Int. Cl.
| *B60K 6/40* | (2007.10) |
| *B60K 6/445* | (2007.10) |
| *B60W 30/18* | (2012.01) |
| *B60K 6/52* | (2007.10) |
| *B60W 10/06* | (2006.01) |

(Continued)

(52) U.S. Cl.
CPC .......... *B60K 6/445* (2013.01); *B60K 6/365* (2013.01); *B60K 6/48* (2013.01); *B60K 6/52* (2013.01); *B60K 17/348* (2013.01); *B60W 10/06* (2013.01); *B60W 10/08* (2013.01); *B60W 20/00* (2013.01); *B60W 30/045* (2013.01); *B60W 30/18127* (2013.01); *B60W 30/18145* (2013.01); *B60K 2006/4825* (2013.01); *B60W 2300/152* (2013.01); *B60W 2720/403* (2013.01); *B60W 2720/406* (2013.01); *B60Y 2200/92* (2013.01); *Y02T 10/6221* (2013.01); *Y02T 10/6265* (2013.01); *Y02T 10/6286* (2013.01); *Y10S 903/911* (2013.01); *Y10S 903/93* (2013.01);

(Continued)

(58) Field of Classification Search
CPC ...................................................... B60K 6/445
See application file for complete search history.

(56) References Cited

U.S. PATENT DOCUMENTS

| 9,132,736 B1 * | 9/2015 | Shukla .................. B60W 20/10 |
| 2007/0034427 A1 | 2/2007 | Janson et al. |
| 2015/0210151 A1 * | 7/2015 | Husson .................. B60K 17/28 |
| | | 180/65.21 |

FOREIGN PATENT DOCUMENTS

| AT | 006549 U1 | 12/2013 |
| DE | 19623738 A1 | 12/1997 |

(Continued)

OTHER PUBLICATIONS

German Search Report issued in counterpart application No. DE102016217616.1 dated Sep. 15, 2016 (8 pages).

(Continued)

*Primary Examiner* — Derek D Knight

(57) ABSTRACT

A drive train system includes at least one internal combustion engine, at least one generator driven by the internal combustion engine for generating electrical energy, at least one electrical machine electrically connected to the generator, at least one driven front axle and at least one driven rear axle, an automatic or manual transmission located between the internal combustion engine and the respective axles, and at least one epicyclic gear unit. Each of the at least one drive front axle and at least one drive rear axle includes output means and is driven by the internal combustion engine.

18 Claims, 3 Drawing Sheets

(51) Int. Cl.
*B60W 30/045* (2012.01)
*B60W 10/08* (2006.01)
*B60K 6/365* (2007.10)
*B60K 6/48* (2007.10)
*B60K 17/348* (2006.01)
*B60W 20/00* (2016.01)

(52) U.S. Cl.
CPC ........ *Y10S 903/945* (2013.01); *Y10S 903/947* (2013.01)

(56) References Cited

FOREIGN PATENT DOCUMENTS

| | | |
|---|---|---|
| DE | 10319681 A1 | 12/2004 |
| DE | 102006033086 A1 | 3/2008 |
| DE | 102009034586 A1 | 1/2011 |
| EP | 0812720 A1 | 12/1997 |
| JP | 2007269072 A | 10/2007 |

OTHER PUBLICATIONS

European Search Report issued in counterpart application No. 17191317.1 dated Jun. 29, 2018. (7 pages).
German Search Report issued in counterpart application No. DE102016217616.1 dated May 23, 2017 (8 pages).

* cited by examiner

DRIVE TRAIN SYSTEM

RELATED APPLICATIONS

This application claims priority to German Application Ser. No. 102016217616.1, filed Sep. 15, 2016, the disclosure of which is hereby expressly incorporated by reference in its entirety.

FIELD OF THE DISCLOSURE

The present disclosure relates to a drive train system for providing drive power for a vehicle, particularly for an agricultural vehicle.

BACKGROUND

A drive train consists of a drive unit and mechanical components such as a crankshaft, a transmission and a differential, which transfer the power from the drive unit onto the surface being driven on. The drive unit can be an internal combustion engine or an electric motor, or a hybrid solution.

U.S. Publication No. 2015/0210151A1 describes a tractor having a battery in conjunction with an electrical generator and an electric motor and including a first motor/generator, which is connected to the motor and to which the battery is connected. The first motor/generator can be operated as a motor, and thus the output shaft is supplied at least in part by electrical energy from the battery.

There is a need to adjust the drive unit in agricultural vehicles flexibly to power demands and simultaneously improve driving comfort.

SUMMARY

In one embodiment of the present disclosure, the drive train system can have at least one internal combustion engine, at least one generator driven by the internal combustion engine for generating electrical energy, at least one electrical machine electrically connected to the generator, at least one driven front axle and one driven rear axle, each having output means and being driven by the internal combustion engine, at least one manual or automatic transmission provided between the internal combustion engine and the respective axles in the drive train, and at least one epicyclic gear unit. The epicyclic gear unit is connected to the output means of the front axle, the electrical machine, and, via the manual or automatic transmission, to the internal combustion engine so that the drive power of the internal combustion engine and of the electrical machine are summed in the epicyclic gear unit and routed to the output means of the front axle. The output means of the front axle are simultaneously driven by the internal combustion engine and the electrical machine.

A four-wheel-drive is ensured by the driven front and rear axles. More than four wheels or chain wheels can be driven, however, depending on the number of axles present.

With the drive train system, the drive power can be routed in the form of electrical and mechanical power to the front axle. The two power paths overlap in the epicyclic gear unit. In any conversion of mechanical energy into electrical energy, there is a power loss due to the electrical losses that occur in the generator. In comparison to a purely electrical drive train system, the efficiency of the system can be increased since a portion of the drive power is routed to the front axle via a mechanical power path.

The electrical machine and the electrical power path are not designed to drive the vehicle without the mechanical power path, but rather to support it. Therefore, the electrical machine can be reduced in size, simultaneously saving weight.

As viewed from the internal combustion engine, the epicyclic gear unit is provided downstream of the manual or automatic transmission in the drive train. In this way, the total power, consisting of the electrical and the mechanical power, is routed to a front axle differential. Then, the total power can be transmitted to the output means. The electrical power is not routed through the manual or automatic transmission, which thus can be designed for a smaller power requirement. The manual or automatic transmission can thereby have a smaller overall size and a lower weight.

A boost function can be implemented, which transmits additional, briefly increased electrical power via the electrical machine when necessary. The boost function uses the electrical power path and is not routed via the manual or automatic transmission, which thereby can have less wear and achieve a longer service life. When drive power is required for a short time, the boost function makes it possible to add a portion of power on the electrical power path in addition to the currently available content of electrical power.

Another embodiment relates to a drive train system that has at least one internal combustion engine, at least one generator driven by the internal combustion engine for generating electrical energy, at least two electrical machines connected to the generator, at least one driven front axle and one driven rear axle, each having output means and being driven by the internal combustion engine, at least one transmission provided between the internal combustion engine and the respective axles in the drive train, and at least two epicyclic gear units. The epicyclic gear units are each connected to the output means of the front axle, a front axle differential, and to a respective one of the electrical machines. The drive power of the internal combustion engine and of the electrical machine are summed in the respective epicyclic gear unit and routed to the respective output means of the front axle, and the output means of the front axle are driven simultaneously by the internal combustion engine and by the electrical machines.

With the drive train system, the drive power can be routed to the front axle in the form of electrical and mechanical power. The two types of power overlap in the epicyclic gear units. In any conversion of mechanical energy into electrical energy, there is a power loss due to the electrical losses that occur in the generator. In comparison to a purely electrical drive train system, the efficiency of the system can be increased, since a portion of the drive power is routed to the front axle via a mechanical path.

The electrical machine is not provided for driving the front axle on its own. Therefore, the electrical machine can be reduced in size, simultaneously saving weight.

As viewed from the internal combustion engine, the epicyclic gear units are provided downstream of the front axle differential in the drive train. Each epicyclic gear unit can be connected to the output means of one vehicle side of the front axle. The total power of the electrical and mechanical power is available downstream of the front axle differential. In case there is a boost function, the output means can be supplied with increased electric power for a short time. The front axle differential and the transmission can be designed for lower power and thus they can have a smaller overall size and a lower weight.

In another embodiment, the generator and at least one electrical machine can be connected to at least one energy storage unit, which may be a rechargeable battery or a battery.

Due to the connection, the generator can charge the energy storage unit and store electrical energy for later use. In an operating mode in which only a small amount of electrical power is required in the output, the electrical power can therefore be routed at least in part into the energy storage unit, i.e., the rechargeable battery or the battery. It is available for later retrieval if power is needed.

In another embodiment, a control unit that is designed to control the epicyclic gear unit can be provided. The controller, or control unit, regulates the relative rotational speed of individual components of the epicyclic gear unit. The summation of electrical and mechanical power can be adjusted. If necessary, a boost function can be implemented, which temporarily makes high electrical power available.

The power distribution between the front and the rear axle can be controlled by the controller. It is therefore possible to implement a flexible distribution of power that is adapted to the current load situation. This can be done by adjusting the relative rotational speeds of the epicyclic gear unit. It is possible to change over as desired between a three-shaft operation and a two-shaft operation.

In another embodiment, the epicyclic gear unit can be a planetary gear unit. High torque can be transmitted by the planetary gear unit. Control can be implemented by regulating a ring gear or a planet carrier. Adjusting the relative speeds of the components of the planetary gear unit can influence the proportion of electrical power and the power distribution between front and rear axles.

In another embodiment, the drive means can have final drives in the form of an epicyclic gear unit, a differential gear unit or a spur gear unit.

The output means are provided in the wheel hubs or sprocket wheel hubs and are used for stepping down the input rotational speed in order to produce a further increase of torque in the wheels or sprocket wheels. The drive train can ensure high spreading of the drive torque and allows a broad application range for heavy towed loads.

In one embodiment, the drive train system can be designed such that the drive power is recuperated during a braking process. A portion of the power received due to the braking process can be converted back into electrical current by means of the electrical machine. In generator mode, the electrical machine produces electrical power, which can be transmitted to the energy storage unit, from the speed and torque present during the braking process. Therefore, a portion of the braking power is again available at a later time.

One embodiment relates to a method for controlling a drive train system having at least one internal combustion engine, at least one generator driven by the internal combustion engine for generating electrical energy, at least one electrical machine electrically connected to the generator, at least one driven front axle and one driven rear axle, each having output means and being driven by the internal combustion engine, at least one manual or automatic transmission provided in the drive train between the internal combustion engine and the respective axles in the drive train, and at least one epicyclic gear unit that is connected to the output means of the front axle, the electrical machine and, via the manual or automatic transmission, to the internal combustion engine. The epicyclic gear unit can be controlled such that drive power is output to the output means or is output by the output means to the electrical machine.

With the method, the drive power can be routed in the form of electrical and mechanical power to the front axle. The two types of power overlap in the epicyclic gear unit. In any conversion of mechanical energy into electrical energy, there is a power loss due to the electrical losses that occur in the generator. In comparison to a purely electrical method, the efficiency of the system can thereby be increased since a portion of the drive power is routed to the front axle via a mechanical path.

The method can implement a boost function, which transmits additional, briefly increased electrical power via the electrical machine when needed. The boost function does not place a load on the manual or automatic transmission, which therefore has less wear and a longer service life.

It is possible to adjust the drive power between the front and the rear axle by controlling the epicyclic gear unit and thus always achieve a power distribution matched to the driving conditions.

In another embodiment, the output means of the front axle can be controlled, in particular accelerated and decelerated, independently of one another and of the rear axle.

The front axle can be driven at a rotational speed different from that of the rear axle. Cornering behavior can be actively influenced by a different rotational speed, so that a smaller turning radius can be maintained by the vehicle.

If at least two electrical machines are used, the method can operate both front wheels at different rotational speeds or with different torques. Thereby, one front wheel can be specifically braked or accelerated. This method can be used for stabilizing the vehicle under critical driving conditions.

In another embodiment, the drive power allocation to the output means of the front and rear axis can be regulated. The allocation of the drive power allows stabilization of the vehicle beyond four-wheel-drive. On different surfaces with changing wheel-ground contact, such as soil and with different inclinations, an improved traction power of the vehicle can be achieved.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
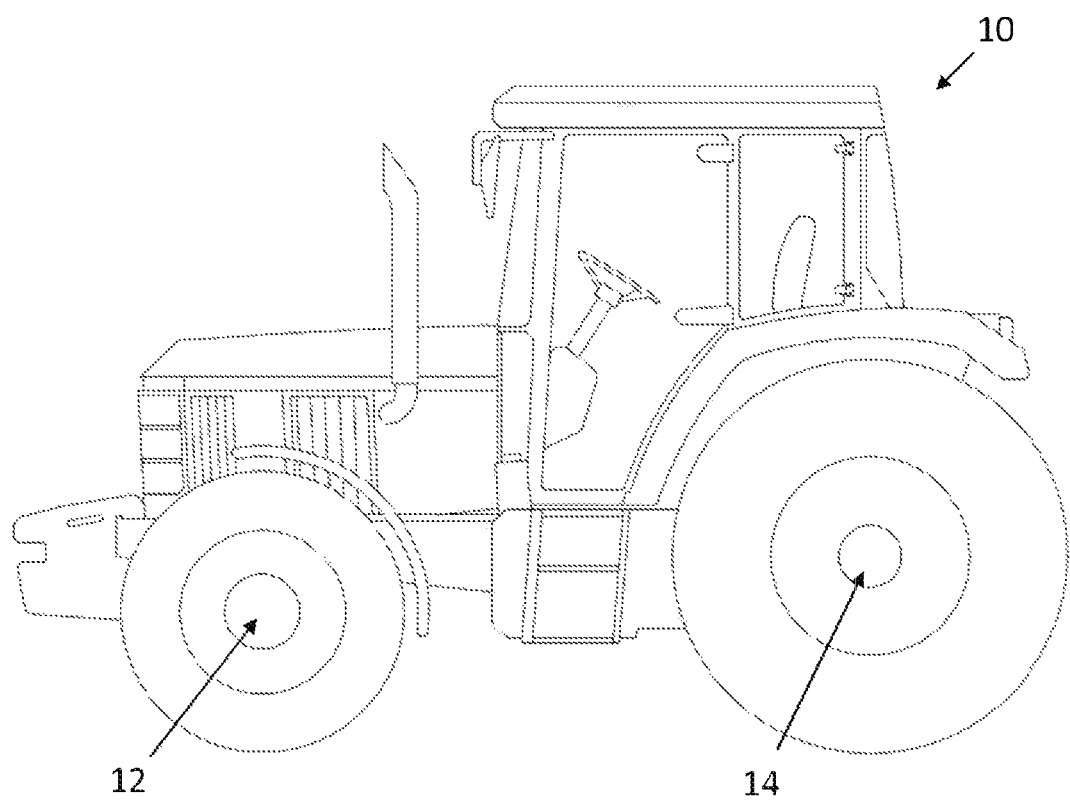
FIG. 1 shows a vehicle for a drive train system according to one embodiment of the present disclosure.

One embodiment of the present disclosure can be used in a tractor 10 such as the one shown in FIG. 1. A conventional tractor 10 has an internal combustion engine 21 and a front and a rear axle. Wheels are located on the axles, but chain drives or track drives can be provided instead of wheels.

The drive train system 20 is suitable for being used in a field sprayer, a construction machine or an additional agricultural vehicle. It is also possible to operate an embodiment of the drive train system 20 with at least two axles rather than only two axles. Particularly in these fields of application, it can be advantageous if additional electrically generated drive power can be applied by an embodiment of the drive train system 20 to the front wheels if necessary.

Both the front axle 12 and the rear axle 14 are driven via the mechanical power path by the drive train system 20, and therefore the mechanically generated power of the internal combustion engine 21 is routed to the wheels by means of a manual or automatic transmission 30, a front axle differential 27, and a rear axle differential 29.

Power produced in an electrical manner is additionally applied to the front wheels by the drive train system 20. A generator 22 that is mechanically connected to the internal combustion engine 21 is provided for this purpose. Due to the drive power of the internal combustion engine 21, the generator 22 generates electric current which is then made available for application of additional power to the front axle 12.

The electric current can also be initially stored in an energy storage unit 34 before it is used for generating power in an application situation. It is also possible, however, not to provide an energy storage unit 34 and therefore the electric current from the generator 22 is used directly for generating power.

The electric current originating from the generator 22 or the energy storage unit 34 is routed to one or more electrical machines 23, 24, which in turn generate drive power from the electric current and therefore apply power from the electrical path to the front axle 12 in addition to the power from the mechanical path.

Figure 2:
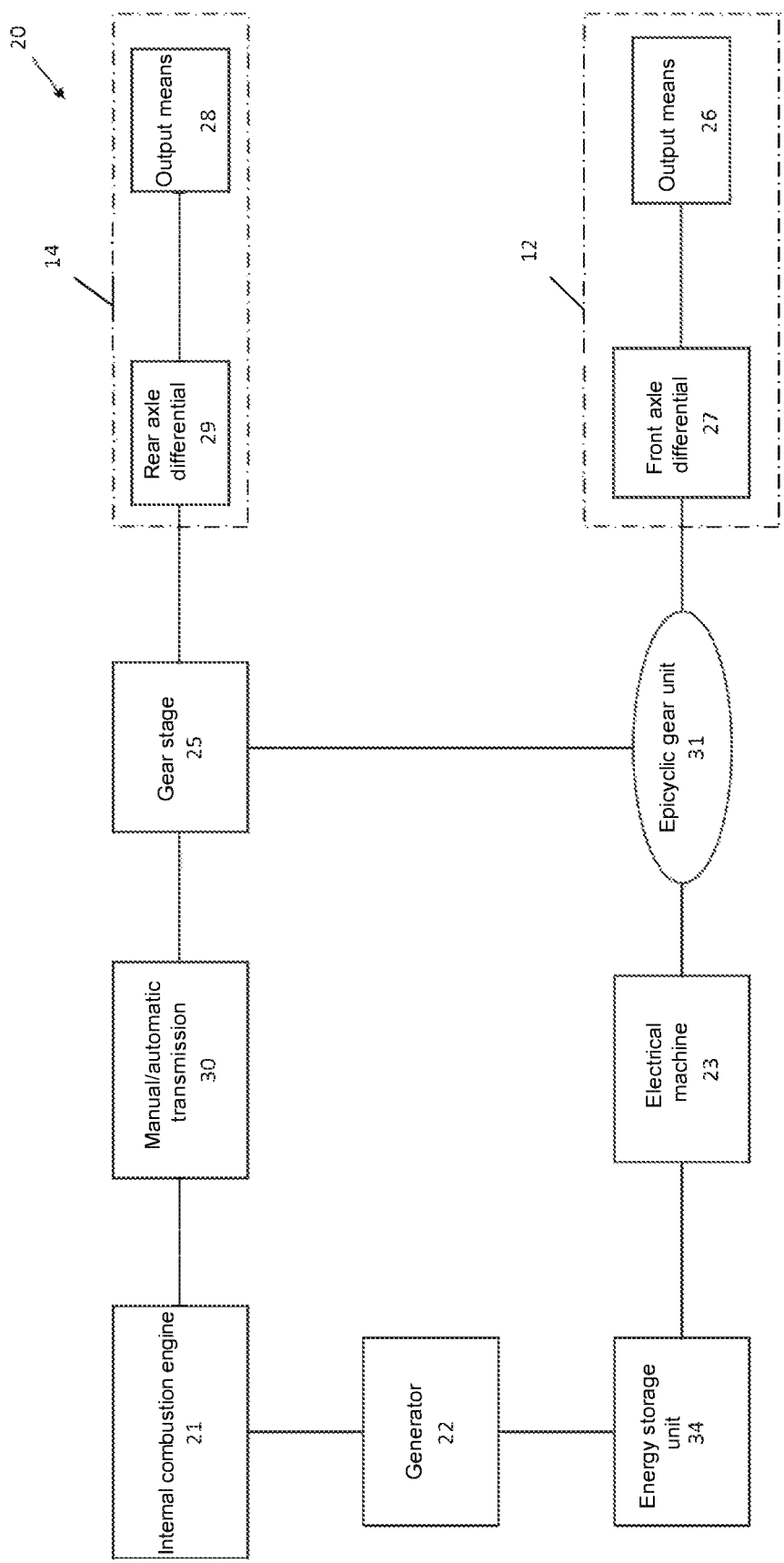
FIG. 2 shows a drive train system for a vehicle according to another embodiment.

FIG. 2 shows an embodiment of the drive train system 20 according to the present disclosure. The drive train system has an internal combustion engine 21. In conjunction with the internal combustion engine 21, a manual or automatic transmission 30 is provided. The transmission 30 is used to adjust the torque and rotational speed of the power to the usage situation. The mechanically generated power of the internal combustion engine 21 is allocated by a gear stage 25 to a front axle drive unit and a rear axle drive unit. The drive unit of the rear axle 14 usually has a rear axle differential 29, to which the output means 28 for the rear axle are connected. The output means consist of a differential gear unit, a planetary gear unit or an epicyclic gear unit, and are used to modify the rotational speed or torque once again before it is routed to the wheels.

Following the gear stage 25, the mechanical power path for the front axle 12 has an epicyclic gear unit 31. The epicyclic gear unit 31 is used to sum up the power from the mechanical path and from the electrical path and route it to a front axle differential 27. Proceeding from the front axle differential 27, the power is routed to the output means 26 of the front axle. These output means have the same function as the output means 28 of the rear axle.

A generator 22 that is mechanically connected to the internal combustion engine 21 is driven by the internal combustion engine 21. The generator 22 can be an electric motor with a conventional design or a generator with a special design such as a claw-pole generator. The generator 22 generates electric current that can be routed to an energy storage unit 34 and stored there. The energy storage unit can be an ordinary battery or a rechargeable battery.

An electrical machine 23 is connected to the energy storage unit 34 and is supplied with electric power from there or directly from the generator 22. The electrical machine 23 can be operated as a motor, in which case a drive torque is generated by the electric power. The electrical machine 23 can also be operated as a generator so that an electric current can be generated by introducing mechanical power into the electrical machine 23.

The electrical machine 23 is connected on the mechanical side thereof to the epicyclic gear unit 31. The mechanical power path and the electrical power path provided by the electrical machine 23 are added in the epicyclic gear unit 31 and routed to the front axle 12.

The epicyclic gear unit 31 can be designed in the form of a planetary gear unit. The epicyclic gear unit 31 can be used in two-shaft or three-shaft mode. This way, it is possible to control the amount of power on the electrical path depending on requirements. The electrical machine 23 is controlled by a controller 33, so that, by means of its electrical drive power, the electrical machine 23 can influence the epicyclic gear unit 31 such that the power is summed up to meet requirements. The summation factor can be determined depending on the difference in speeds of the individual shafts in the epicyclic gear unit.

The controller 33 can be used to control the generator 22 such that it can be shut off depending on requirements.

If necessary, additional electrical power can be routed to the front axle 12 by the electrical power path with the aid of the controller 33. The electrical power path does not run via the transmission 30 so that it is not burdened by the summed power but can always be driven by the mechanical power path, which is driven exclusively mechanically by the internal combustion engine.

A distribution of power between the front axle 12 and the rear axle 14 can be achieved by controlling the epicyclic gear unit 31. Due to the active control of the epicyclic gear unit 31, the power can be redistributed from the front axle 12 to the rear axle 14 if necessary. The distribution of power between the front and the rear axle can be controlled to meet requirements. Continuous simultaneous usage of the electrical and the mechanical power paths can be provided as the standard drive for the vehicle, with a changing power distribution between the front and the rear axle.

With the additional electrical power, the front axle can be equipped with a pre-run. The output means of the front axle 12 rotate at a higher or lower rotational speed than those of the rear axle in such a case. With this feature, the vehicle can have better response behavior when cornering. A better deceleration behavior of the vehicle can be achieved, particularly at higher speeds or with a large towed load.

During the deceleration process, a portion of the power can be converted into an electric current by the electrical machine 23 in generator mode and can be stored in the energy storage unit 34.

Figure 3:
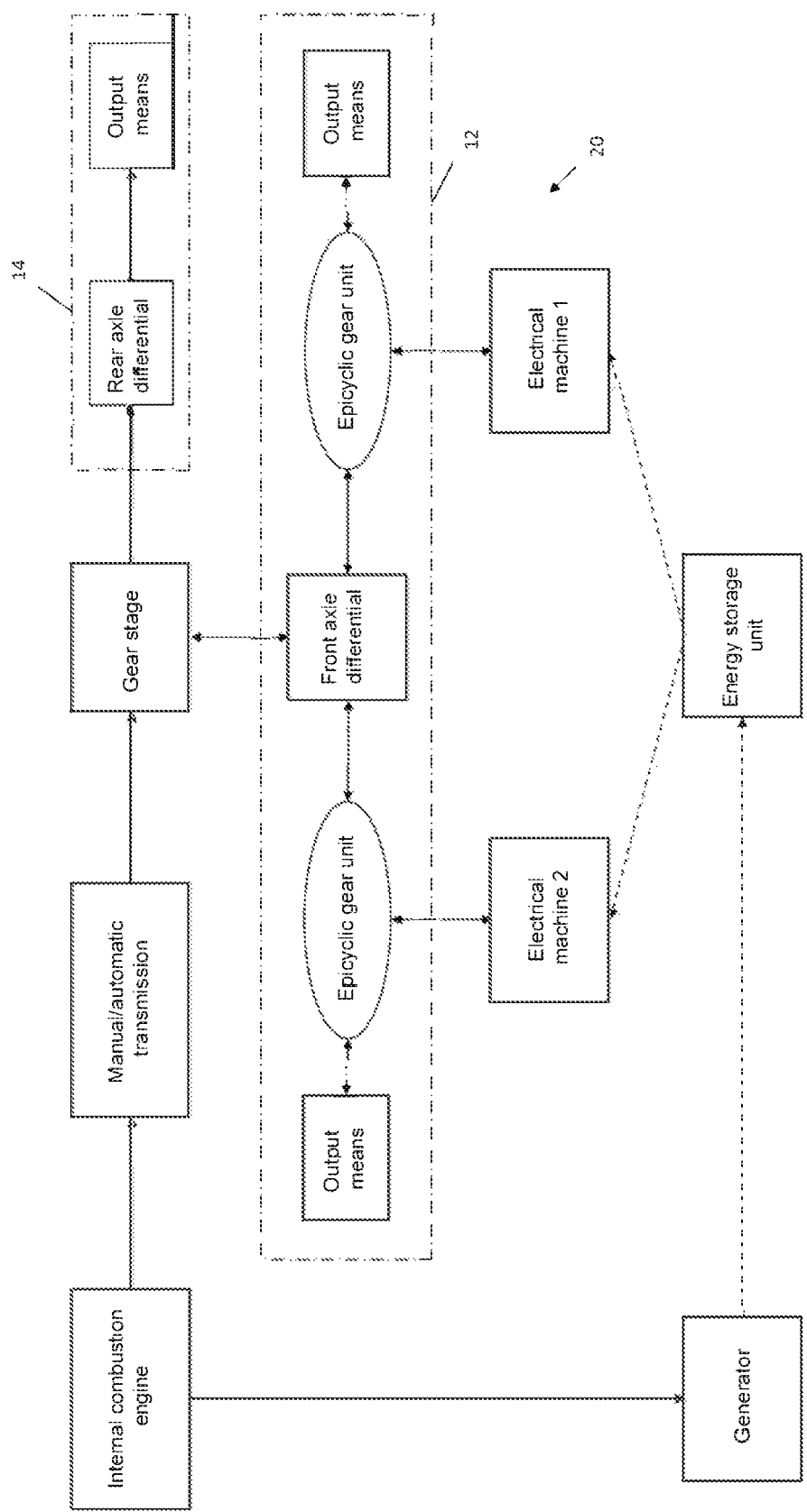
FIG. 3 shows a drive train system according to a further embodiment.

FIG. 3 shows another embodiment of the drive system. This embodiment differs from that according to FIG. 2 by the use of two epicyclic gear units 31, 32.

Corresponding to the embodiment according to FIG. 1, a generator 22 for generating electric power is driven by the internal combustion engine 21. The internal combustion engine 21 generates mechanical power, which is routed via a manual or automatic transmission 30 and a gear stage 25 of a four-wheel-drive to a front and a rear axle 12, 14. A front axle differential 27, which is in turn connected to two epicyclic gear units 31, 32, is connected to the gear stage 25. The power is introduced into the two epicyclic gear units 31, 32 by the front axle differential 27.

The generator 22 can be connected to the energy storage unit 34 so that electric power can be stored for a later use. The energy storage unit 34 and the generator 22 are connected to two electrical machines 23, 24 so that the electrical energy can be routed to the electrical machines 23, 24. The electrical machines 23, 24 are connected to a controller 33.

The electrical power path is superimposed on the mechanical power path on both sides of the front axle 12 by the two epicyclic gear units 31, 32 and is routed to the output means 26. The electrical energy can therefore be additionally used for driving the front axle 12, as in the embodiment of FIG. 1.

Both sides of the front axle 12 can be controlled independently of one another by the two epicyclic gear units 31, 32 and the two electrical machines 23, 24. Depending on the necessary driving situation, one side of the vehicle can be supplied with more or less drive power, whereby an active steering can be implemented. By targeted acceleration and deceleration, the driving stability can be increased even at high speed.

If lateral forces occur or during unstable driving conditions, a stabilizing condition can be produced by adjusting speed or torque on both sides of the front axle 12. Driving safety can be increased, particularly in the agricultural field with high towed loads. The vehicle can be returned to a safe dynamic region by active steering assistance or by active braking.

A traction force interruption during the shifting process of the manual or automatic transmission 30 can be avoided by the embodiments of the drive system 20. While the mechanical power path is interrupted by the shifting process, the electrical power path provides constant power.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A drive train system, comprising:
   an internal combustion engine,
   a generator driven by the internal combustion engine for generating electrical energy,
   a first electrical machine and a second electrical machine electrically connected to the generator,
   a front axle comprising a front differential, a first output gear unit, and a second output gear unit,
   a rear axle comprising rear differential and a third output gear unit,
   a transmission provided between the internal combustion engine and the front and rear differentials,
   a first epicyclic gear unit coupled to the front axle differential, the first output gear unit, and the first electrical machine, the first epicyclic gear unit connected between the front axle differential and the first output gear unit, and
   a second epicyclic gear unit coupled to the front axle differential, the second output gear unit, and the second electrical machine, the second epicyclic gear unit connected between the front axle differential and the second output gear unit,
   wherein the drive power of the internal combustion engine and the first electrical machine are summed in the first epicyclic gear unit and transferred to the first output gear unit of the front axle, and the drive power of the internal combustion engine and the second electrical machine are summed in the second epicyclic gear unit and transferred to the second output gear unit of the front axle.

2. The drive train system of claim 1, wherein the generator and the electrical machine are coupled to at least one energy storage unit.

3. The drive train system of claim 2, wherein the at least one storage unit comprises a rechargeable battery.

4. The drive train system of claim 1, further comprising a controller operably controlling the epicyclic gear unit.

5. The drive train system of claim 1, wherein the epicyclic gear unit is a planetary gear unit.

6. The drive train system of claim 1, wherein the output gear unit comprises final drives in the form of an epicyclic gear unit, a differential gear unit or a spur gear unit.

7. The drive train system of claim 1, wherein the transmission comprises an automatic or manual transmission.

8. A drive train system, comprising:
   at least one internal combustion engine,
   at least one generator driven by the internal combustion engine for generating electrical energy,
   a first electrical machine and a second electrical machine electrically connected to the generator,
   at least one front axle and at least one rear axle, the front axle comprises a first and a second output gear unit and the rear axle comprises a third output gear unit,
   at least one transmission provided between the internal combustion engine and the respective axles in the drive train, and
   a first epicyclic gear unit and a second epicyclic gear unit coupled to the respective first and second output gear units of the front axle, a front axle differential, and the respective first and second electrical machines, the first epicyclic gear unit connected between the front axle differential the first output gear unit, and the second epicyclic gear unit connected between the front axle differential and the second output gear unit,
   wherein the drive power of the internal combustion engine and the first and second electrical machines are summed in the respective first and second epicyclic gear units and transferred to the respective first and second output gear units of the front axle, and the first and second output gear units of the front axle are simultaneously driven by the internal combustion engine and the respective first and second electrical machines.

9. The drive train system of claim 8, wherein the generator and the electrical machine are coupled to at least one energy storage unit.

10. The drive train system of claim 9, wherein the at least one storage unit comprises a rechargeable battery.

11. The drive train system of claim 8, further comprising a controller operably controlling the epicyclic gear unit.

12. The drive train system of claim 8, wherein the epicyclic gear unit is a planetary gear unit.

13. The drive train system of claim 8, wherein the output gear unit comprises final drives in the form of an epicyclic gear unit, a differential gear unit or a spur gear unit.

14. The drive train system of claim 8, wherein the transmission comprises an automatic or manual transmission.

15. A method for controlling a drive train system, comprising:
   providing an internal combustion engine, a generator driven by the internal combustion engine, a first electrical machine and a second electrical machine electrically connected to the generator, a front axle having a first and a second output gear unit, a rear axle having a third output gear unit, a transmission disposed between the internal combustion engine and the respective axles, a first epicyclic gear unit coupled to the first output gear unit of the front axle and the first electrical machine, and a second epicyclic gear unit coupled to the second output gear unit of the front axle and the second electrical machine, the first epicyclic gear unit connected between the front axle differential and the first output gear unit, and the second epicyclic gear unit connected between the front axle differential and the second output gear unit, generating electrical energy by the generator, and controlling the first epicyclic gear unit such that drive power of the internal combustion engine and the first electrical machine are summed and output to the first output gear unit, and controlling the second epicyclic gear unit such that drive power of the internal combustion engine and the second electrical machine are summed and output to the second output gear unit.

16. The method of claim 15, wherein the controlling step comprises controlling the first and second epicyclic gear units such that the first and second output gear unit of the front axle are accelerated or decelerated independently of one another and of the rear axle.

17. The method of claim 15, further comprising regulating a distribution of the drive power to the first and second output gear unit of the front axle and the third output gear unit of the rear axle.

18. The method of claim 15, further comprising:

performing a braking process with the drive train system; and recuperating the drive power during the performing step.

* * * * *